United States Patent
Cui

(10) Patent No.: US 7,774,356 B2
(45) Date of Patent: Aug. 10, 2010

(54) METHOD AND APPARATUS FOR APPLICATION STATE SYNCHRONIZATION

(75) Inventor: Weiyi Cui, Shanghai (CN)

(73) Assignee: SAP AG, Walldorf (DE)

( * ) Notice: Subject to any disclaimer, the term of this patent is extended or adjusted under 35 U.S.C. 154(b) by 246 days.

(21) Appl. No.: 11/633,760

(22) Filed: Dec. 4, 2006

(65) Prior Publication Data

US 2008/0134211 A1   Jun. 5, 2008

(51) Int. Cl.
G06F 7/00 (2006.01)

(52) U.S. Cl. .................... 707/769; 707/802; 710/39; 710/40; 710/107; 710/200; 710/220; 710/240; 710/241; 710/242; 710/243; 710/244; 717/168

(58) Field of Classification Search ............... None
See application file for complete search history.

(56) References Cited

U.S. PATENT DOCUMENTS

| | | | | |
|---|---|---|---|---|
| 5,168,570 | A * | 12/1992 | Eckert et al. ............... | 710/241 |
| 5,692,209 | A * | 11/1997 | Meaney et al. ............. | 710/244 |
| 6,292,835 | B1 * | 9/2001 | Huang et al. ............... | 709/235 |
| 6,581,075 | B1 * | 6/2003 | Guturu et al. .............. | 707/201 |
| 6,763,379 | B1 * | 7/2004 | Shuster ...................... | 709/224 |
| 6,877,072 | B1 * | 4/2005 | Dias et al. .................. | 711/151 |
| 7,003,110 | B1 * | 2/2006 | Jakobsson et al. ........... | 380/45 |
| 7,380,243 | B2 * | 5/2008 | Sugishita et al. ........... | 717/168 |
| 7,512,631 | B2 * | 3/2009 | Medicke et al. ............ | 707/103 R |
| 7,606,881 | B2 * | 10/2009 | Chasman et al. ............ | 709/221 |
| 2002/0049730 | A1 * | 4/2002 | Ishikawa et al. ............. | 707/1 |
| 2003/0105884 | A1 * | 6/2003 | Upton ........................ | 709/318 |
| 2004/0098378 | A1 * | 5/2004 | Kimchi et al. ................ | 707/3 |
| 2007/0219816 | A1 * | 9/2007 | Van Luchene et al. ........ | 705/1 |
| 2007/0294450 | A1 * | 12/2007 | Rudnick et al. ............. | 710/244 |

OTHER PUBLICATIONS

Schmidt, Douglas C., "Asynchronous Completion Token," Siemens AG, 1998, 16 pages.

* cited by examiner

Primary Examiner—Tim T. Vo
Assistant Examiner—Hasanul Mobin
(74) Attorney, Agent, or Firm—Mintz, Levin, Cohn, Ferris, Glovsky & Popeo, P.C.

(57) ABSTRACT

A method and an apparatus that synchronize an application state in a client with a data source in a backend system in an asynchronous manner are described. A response is sent to the client based on a priority determined according to a history of received update requests. When a notification message from a data source in a backend system is received, an update request is selected from a plurality of update requests currently pending to be served according to the priority associated with each update request. A response is sent to the client over a network corresponding to the selected update request. The response includes state updates according to the changes in the data source and the current application state in the corresponding client.

20 Claims, 12 Drawing Sheets

US 7,774,356 B2

METHOD AND APPARATUS FOR APPLICATION STATE SYNCHRONIZATION

FIELD OF INVENTION

The present invention relates generally to enterprise computing. More particularly, this invention relates to synchronizing an application state with a data source.

BACKGROUND

More and more browser based applications are incorporated in modern enterprise computing. Typically, a browser updates its application state, such as a business process view, from a corresponding server based on a user's request. Recent advancements of browser capabilities, such as the adoption of RIA (Rich Internet Application) technology, has made it possible for a browser to automatically synchronize its application state with a backend server without requiring explicit requests from a user. Hence, the interaction between a browser user and the browser does not need to be blocked while application states are being synchronized. Usually, a script-based timer is utilized to trigger periodic requests and responses from inside the browser using a hidden HTTP (Hypertext Transport Protocol) communication channel.

FIG. 1 is a timing diagram illustrating an example of the timer based state synchronization in browser based applications. When a state synchronization request 101 is triggered by end users through a user interface in a browser based application 103, a script-based timer 105 is usually initialized with a timer value to make periodic requests and responses with server side actions 109 in an ongoing manner (e.g. looping) 111. A browser based hidden communication channel using HTTP 107 may be set up to update the browser user interface 117 with the latest state data carried in the responses. A business object 113 may be called to retrieve the latest state data from a data source 115 when a request is received at the server.

However, the timer based communication channel sends back nearly the same amount of data between a browser and a server periodically regardless whether the application state in the browser is synchronized with the server or not. Obviously, such a method is inefficient in many cases especially when the application state does not change that often.

In addition, computing processing power and network transportation capacity may be wasted due to large number of unnecessary requests and responses between a browser and a server. Often times, handling transactions of such a hidden communication channel also increases the response latency for a user to interact with a browser. Usually, the tighter the synchronization requirement is, the larger the number of such transactions is needed, even when there is little change to update from a server.

SUMMARY OF THE DESCRIPTION

The embodiments of the present invention include a method and apparatus that send a response to a client to synchronize a state with a data source based on a priority determined according to a history of received update requests. When a notification message from a data source in a backend system is received, an update request is selected from a plurality of update requests currently pending to be served according to the priority associated with each update request. A response is sent to the client over a network corresponding to the selected update request. The response includes state updates according to the changes in the data source and the current application state in the corresponding client.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus for synchronizing states of a client application with a backend system in an asynchronous manner over internet are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

Figure 1:
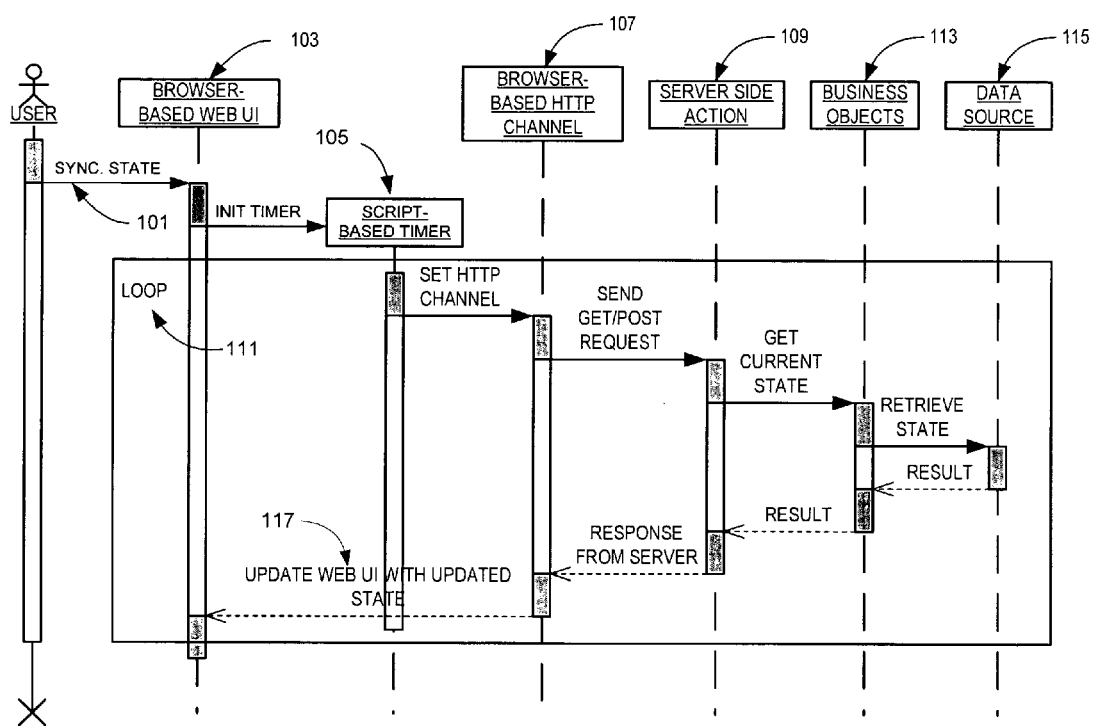
FIG. 1 is a timing diagram illustrating an example of timer-based state synchronization in browser based applications.
Figure 2:
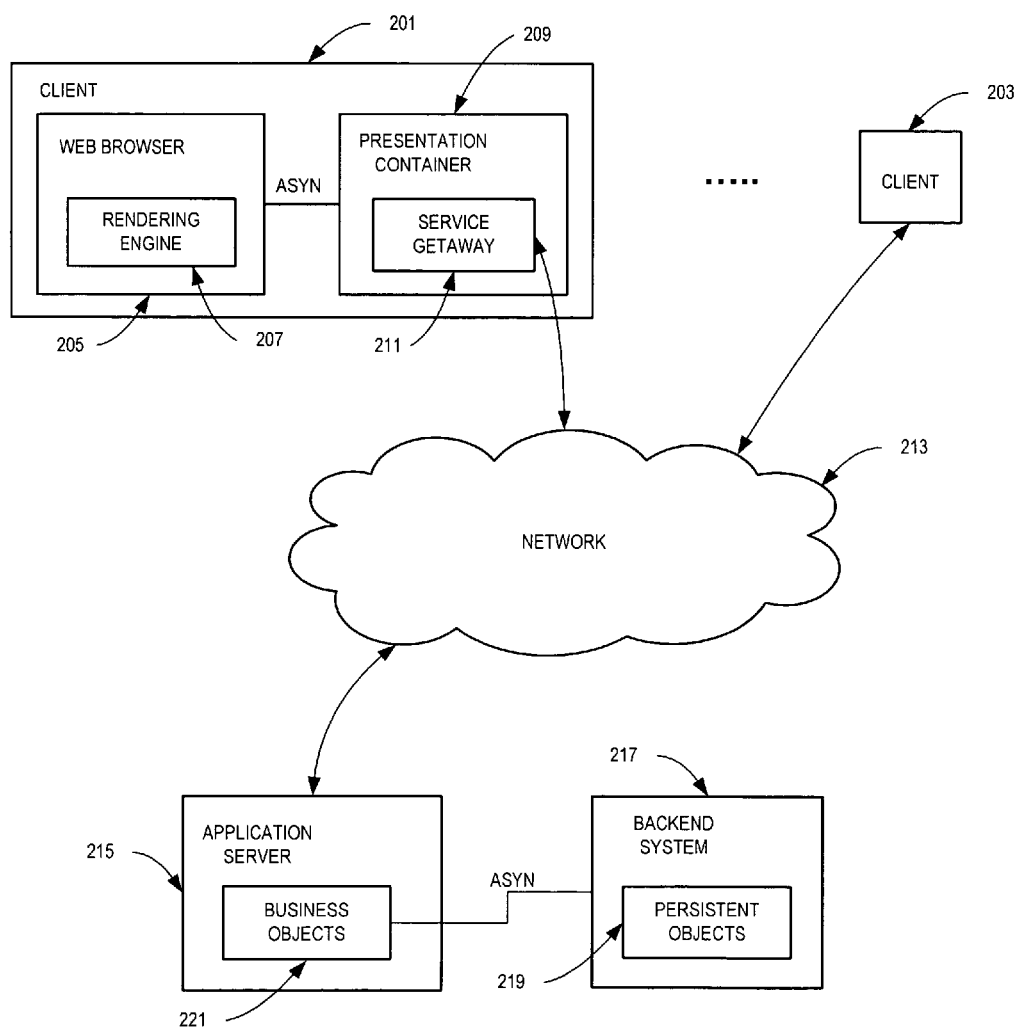
FIG. 2 is a block diagram illustrating one embodiment of a network system for synchronizing a client application with a backend system.

FIG. 2 is a block diagram illustrating one embodiment of a network system for synchronizing a client application with a backend system. Referring to FIG. 2, according to one embodiment, one or more clients, 201, 203, according to one embodiment, are coupled to an application server 215 through a network 213. The network 213 may be the Internet, a local area network or a wide area network. The client 201 may include a web browser 205 having a rendering engine 207. The web browser 205 may be based on Internet Explorer from Microsoft Inc., Mozilla from Mozzila.org, or Opera from Opera Software. A web browser 205 may be asynchronously coupled with a presentation container 209. The presentation container 209 may maintain a state of the data to be presented by the rendering engine 207 of the web browser 205. A service gateway 211 inside the presentation container 209 may retrieve updates of the application state from an application server 215 through a network 213. In one embodiment, the service gateway 201 sends an update request including a current state of data maintained in the presentation container 209 to the application server 215 to receive updates of the application states according to business objects 221 inside the application server 215.

In one embodiment, business objects determine whether any update is available when receiving an update request from the client 201. The application server 215 may not respond to an update request from the client 201 when no corresponding state updates are available as determined by the business object 221. In one embodiment, the network connection established by an update request remains open until at least one update response is sent from the application server 215. In one embodiment, business objects 221 are asynchronously coupled to a backend system storing data sources as persistent objects 219 such as data tables or structures in a database. The asynchronous connection may be established over a local area network, a wide area network, or a local connection such as a serial bus or interconnect. In one embodiment, business objects 211 are notified by the backend system 217 when changes occur in the data sources. Business objects 221 may identify relevant changes in the data source for a received update request. In one embodiment, the application server 215 sends out a response to the client 201 when business objects 221 identifies relevant changes in the data source based on an update request received from the client 201. In one embodiment, the application server 215 responds to a request when notified by the backend system 217.

Figure 3:
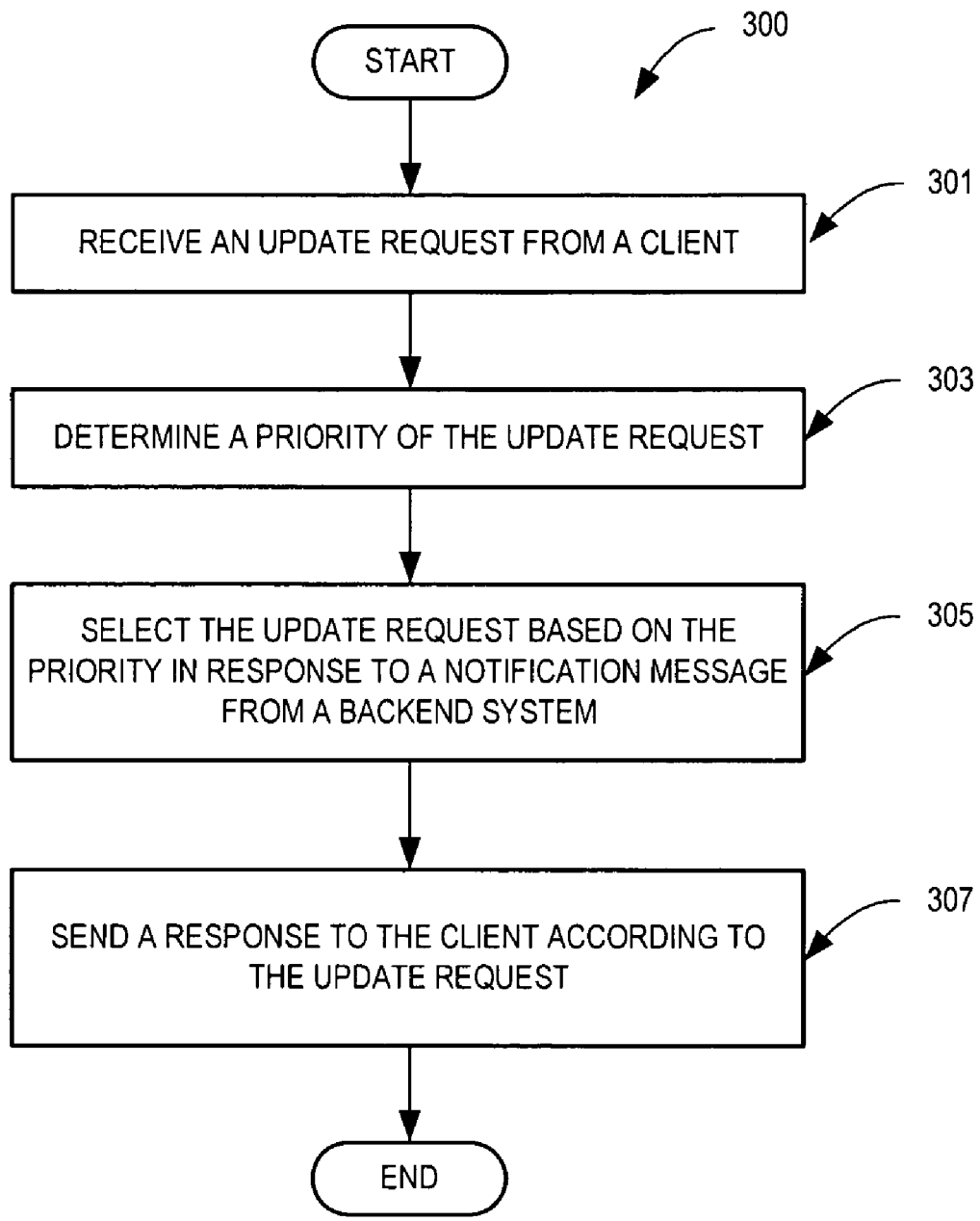
FIG. 3 is a flow diagram illustrating one embodiment of a process for synchronizing a client and a backend system.

FIG. 3 is a flow diagram illustrating one embodiment of a process 300 for synchronizing a client and a backend system. For example, the process 300 may be performed by systems as shown in FIG. 2 and/or FIG. 4. In one embodiment, the process 300 includes, but not limited to, determining a priority of an update request among a plurality of update requests in response to receiving the update request from a client and sending a response to the client corresponding to the update request selected based on the priority responding to a notification message about a data change from a data source. In one embodiment, an update request is received from a client at block 301. The update request may include information about a current application state of a client, such as the completion information of print jobs from printing spool or the availability information of certain resources needed by current application. In one embodiment, the processing logic determines a priority of the received update request among multiple update requests waiting to be served at block 303. Priority relationships may be maintained among multiple update requests. In one embodiment, more than one update requests may be received from the same client. At block 305, according to one embodiment, in response to a notification message from a backend system, an update request is selected according to the priority from among the multiple update requests already received. The backend system may include a data source for the application state of the client. The notification message may be sent out from the backend system due to a change in the data source. In one embodiment, a response is sent to the client according to the update request selected at block 307. The response may include updates of the application state according to changes in data source in the backend system and the current application state in the corresponding client.

Figure 4:
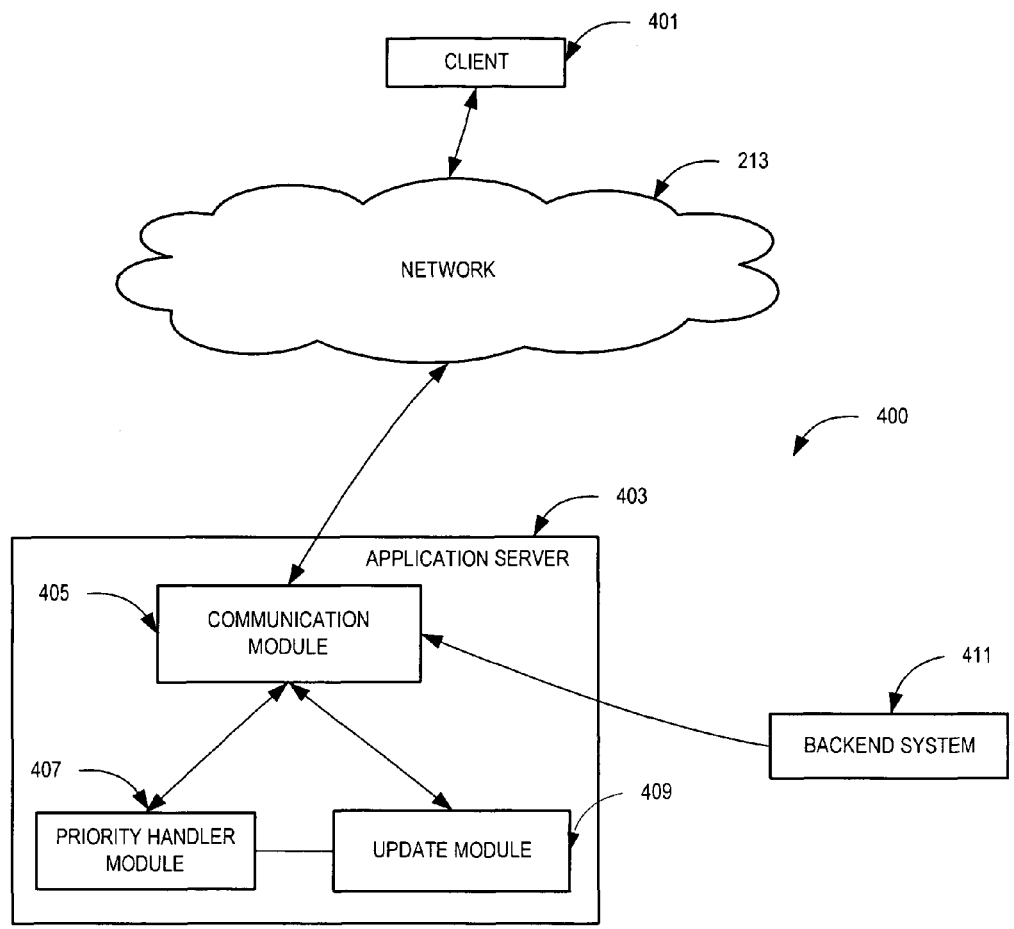
FIG. 4 is a block diagram illustrating one embodiment of a network environment for synchronizing a client and a backend system.

FIG. 4 is a block diagram illustrating one embodiment of a network environment for synchronizing a client and a backend system. In one embodiment, the system 400 includes, but is not limited to, a communication module, a priority module and an update module. The communication module may receive an update request from a client. The communication module may receive a notification message about a data change from a data source. The communication module may send a response to the client. The priority module may determine a priority of the update request among a plurality of update requests. The update module may generate the response including the data change in response to the notification message corresponding to the update request selected from the plurality of update requests based on the priority. In one embodiment, a client 401 sends an update request to synchronize with data sources in a backend system 411. An update response may be sent to the client 401 to update the current application state in the client 401 in response to the update request for synchronizing with the data sources. The client 401 may send out another update request when receiving an update response.

In one embodiment, a communication module 405 in the application server 403 receives the update request. The update request may include information about the current application state of the client 401. In one embodiment, the communication module forwards the update request to a priority handler module 407 to determine a priority of the request among multiple requests currently waiting to be served in the application server 403. In one embodiment, the application server 403 is communicatively coupled to a backend system 411 through a local area network, a wide area network, or a local connection, such as a serial bus or an interconnection. In one embodiment, the application server 403 listens for a notification message from the backend system 411 without blocking operations of the application server. For example, receiving the notification message may be implemented as a separate thread. As a result, receiving the notification message from the backend system 411 may be asynchronously performed with respect to operations of the application server 403. In one embodiment, the application server 403 sends a requesting message to the backend system 411 according to the update request received. In another embodiment, the application server 403 sends a message to the backend system 411 to register notification messages without receiving any update request from any client.

In one embodiment, the backend system 411 sends a notification message to be received by the communication module 405 when changes occur in data sources associated with the backend system 411. In one embodiment, the communication module 405 retrieves data changes from the backend system 411 for an update module 409 to select an update request according to their priorities (e.g. via a first thread). In one embodiment, the communication module sends an update response to the client 401 according to the selection by the update module 409 (e.g. via a second thread). Multiple update requests may be selected by the update module 409 based on a single notification message from the backend system 411. In one embodiment, the communication module 405 sends out one update response for each selected update request. Note that some or all of the components as shown in FIG. 4 may be implemented in software, hardware, or a combination of both.

Figure 5A:
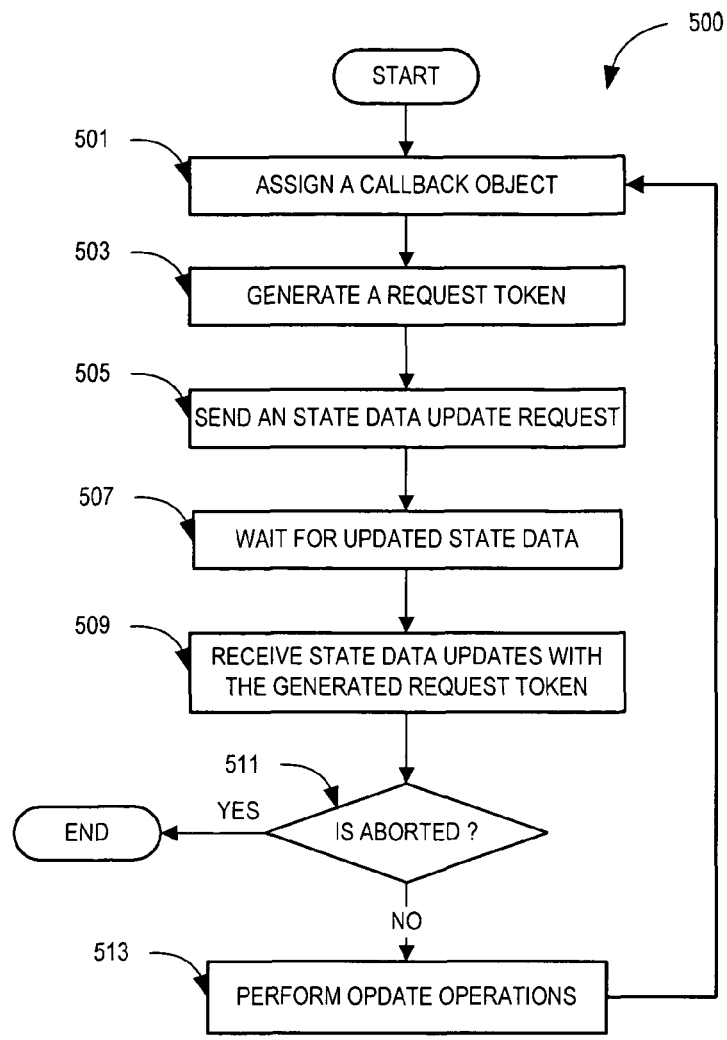
FIG. 5A is a flow diagram illustrating one example of a process for a client application to receive updated state data.
Figure 5B:
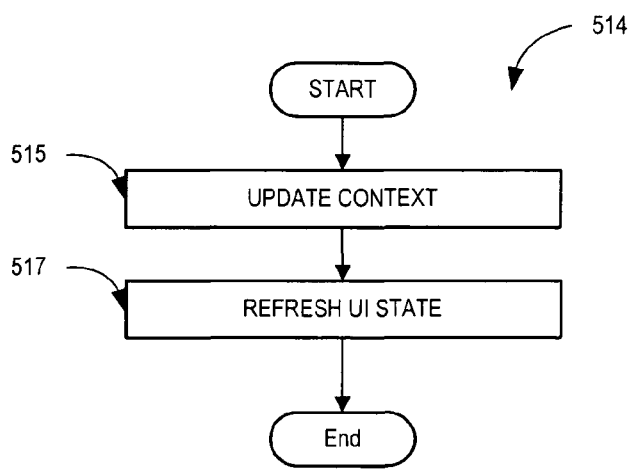
FIG. 5B is a flow diagram illustrating one example of a process for a client application to update application states.

FIGS. 5A and 5B are flow diagrams illustrating example processes for a client application to receive updated state data and update corresponding application state. The client application may be a RIA application. Referring to FIG. 5A, a client processing logic may assign a callback object for an update request at block 501. An update request may be a state synchronization request. A callback object may be associated with references to handlers to complete updates of an application state, such as refreshing a user interface. The processing logic may also generate a request token at block 503. A request token may be a data structure to be included in an update request. The data structure in the request token may comprise a reference to the callback object assigned at block 501. At block 505, the processing logic sends a state update request including the generated request token. Subsequently, the processing logic may wait for responses to update state data at block 507 without block operations of the client application. After the processing logic receives responses to update an application state with the generated request token at block 509, the processing logic may check whether the current application state has been aborted at block 511. When a user switches from one business process view to a new business process view, the application state corresponding to the old business process view may be aborted. The processing logic may complete if the corresponding application state has been aborted. Otherwise, the processing logic may activate the handlers referenced in the request token included in the received responses to perform update operations at block 513. The processing logic may call an update process 514 in FIG. 5B to perform update operations in an asynchronous manner. The update process 514 may update context data at block 515 and refresh a user interface according to the updated context data at block 517.

Figure 6:
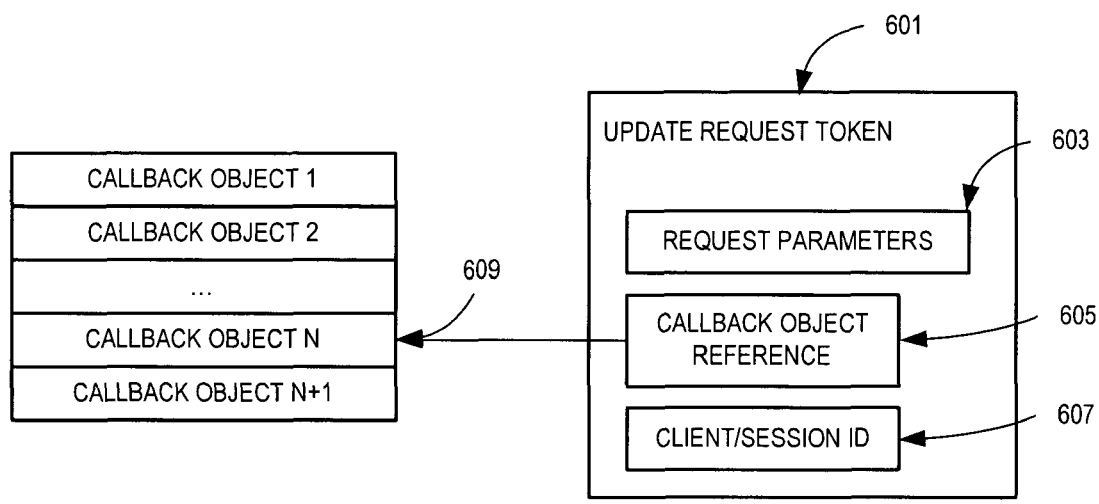
FIG. 6 is a block diagram illustrating one embodiment of a request token for an update request.

FIG. 6 is a block diagram illustrating one embodiment of a request token for an update request. In one embodiment, a request token 601 is a data structure including request parameters 603, a callback object reference 605 and a client/session identifier 607. In one embodiment, a callback object reference 605 points to a callback object 611 is assigned by the client generating the token 601. The client may be associated with multiple callback objects. The callback object reference 605 may be used by the requesting client to locate the pointed callback object 611 after receiving an update response. Request parameters 603 may be related to the corresponding update request, such as a set of required input values when the requesting client activating the callback object 609 through the callback object reference 605 after receiving an update response. In one embodiment, the client/session identifier 607 identifies the requesting client for the receiving server to maintain a priority among multiple update requests. In another embodiment, the client/session identifier 607 includes a connection session established between a requesting client and a receiving server.

Figure 7:
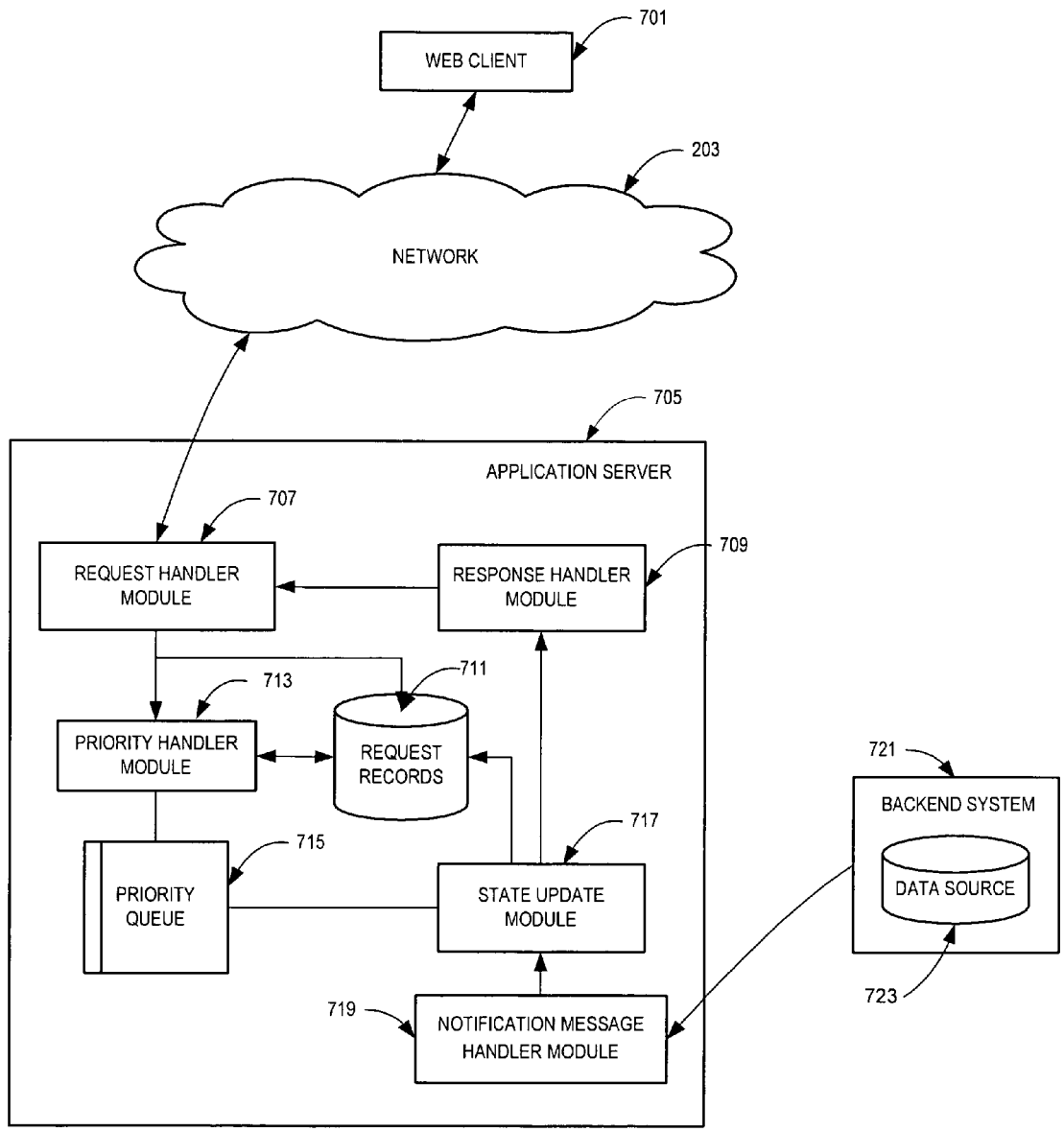
FIG. 7 is a block diagram illustrating one embodiment of a server system for synchronizing a client with a data source through a network.

FIG. 7 is a block diagram illustrating one embodiment of a server system for synchronizing a client with a data source through a network. In one embodiment, a web client 701 is communicatively coupled to an application server 705 through a network 203. The web client 701 may send a state update request to the application server 701 for synchronizing an application state in the web client 701 with a data source 723 in a backend system 721. In one embodiment, a request handler module 707 in the application server 705 receives a state update request. The request handler module 707 may extract request information from the update request including a request token and the corresponding client application state. The request handler module 707 may record the request in a request record database 711, which may be a single database or multiple databases locally or remotely connected. A request record in the database 711 may include when the request is received and identifications of the requesting client, such as an IP address. In one embodiment, a priority handler module 713 maintains a priority among received update requests pending to be served by the application server 705 in a priority queue 715. In one embodiment, the priority queue 715 includes the request token associated with an update request. The priority handler module 713 may determine a priority of the update request received at the request handler module 707 with respect to other update requests in the priority queue 715. In one embodiment, the priority handler module 713 makes a priority decision based on information retrieved from the request record database 711.

In one embodiment, the notification message handler module 719 listens periodically or continuously to messages from a backend system 721 communicatively coupled to the application server 705. In one embodiment, the backend system 721 includes a data source 723. The data source 723 may be a database for persistency management of business objects. The backend system 721 and the application server 705 may be merged in a single system. In one embodiment, once an update of the data source 723 is available, the notification message handler module 719 receives an update message from the backend system 721 to notify the update. The update message may originate from the data source 723.

In one embodiment, the notification message handler module 719 retrieves the updated data from the data source 723 after receiving the update message. In one embodiment, the state update module 717 matches update requests pending in the queue 715 with the updated data according to information about the associated application states with. The state update module 717 may select a matched update request with the highest priority based on the priority queue 715. The state update module 717 may remove the entry corresponding to the selected update request from the priority queue. In one embodiment, the state update module 717 records the selection in the request records 711. In one embodiment, the response handler module 709 constructs a response for the selected update request based on the updated data. In one embodiment, the request handler module 707 sends back the constructed response to the requesting client associated with the selected update request including a request token. Note that some or all of the components as shown in FIG. 7 may be implemented in hardware, software, or a combination of both.

FIG. $8A_{[CUIW2]}$ is a flow diagram illustrating one embodiment of a process for handling a state synchronization request from a client in accordance with the system of FIG. 7. In one embodiment, the processing logic receives a state update request from a client at block 801. The update request may include information about the current application state of the client. For example, a stock symbol and the date/time of the last quote may be included in the application state of a stock monitoring application. In one embodiment, the update request carries a request token having a structure as shown in FIG. 6. The update request may be an HTTP request with a request token in the request body. At block 803, according to one embodiment, the processing logic decodes the update request to extract application state information, the request token, and the embedded token data. A token data may include a session id as shown in FIG. 6. The processing logic may record the received request in a request record database at block 803.

In one embodiment, the processing logic determines if the session id of the update request is new at block 805. The processing logic may compare the session id with the existing set of session ids stored in the request database. In one embodiment, the processing logic matches the newly received session id with session ids stored in a priority queue. If an existing update request with the same session id is found, according to one embodiment, the processing logic analyzes the request history of the requesting client based on the request record database. The processing logic may derive a frequency of making update requests from the requesting client over a time period. In one embodiment, the processing logic compares derived frequencies between the requesting client and other clients having update requests waiting to be served. In another embodiment, the processing logic compares derived frequencies between update requests of different session ids. In one embodiment, more than two session ids may be associated with the update requests from the same requesting client waiting to be served. The processing logic may determine the newly received update request is frequent if the derived frequency of the requesting client is higher than a predetermined frequency value. A sample frequency value could be predetermined as a base, which may later on be fine-tuned in a heuristic manner. In another embodiment, the processing logic determines a newly received update request is frequent based on the average time interval of earlier update requests received from the same requesting client. If the average time interval of the earlier update requests from the same requesting session id is less than a predetermined time interval value, the processing logic may determine the newly received update request is frequent. The sample time interval value is derived from the frequency value as a reciprocal.

In one embodiment, at block 811, the processing logic updates a priority queue for a set of update requests received from one or more clients waiting to be served. The processing logic may update the priority queue based on a derived history for each update request associated with the priority queue. In another embodiment, the processing logic updates the priority queue based on the time interval since the last update request of the same session id. At block 809, according to one embodiment, if the processing logic determines the newly received update request is not frequent, the processing logic adds a new entry to the priority queue to include the newly received update request. The processing logic may assign the lowest priority to the newly added entry in the priority queue at block 809.

Figure 8A:
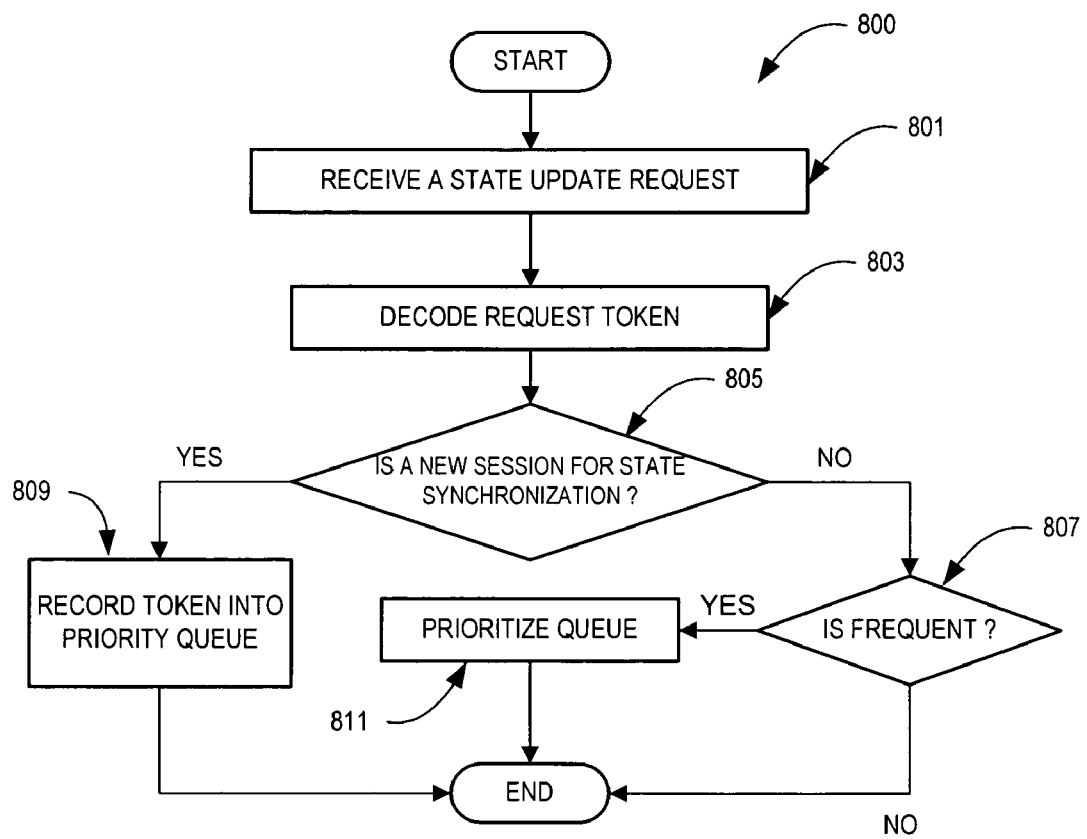
FIG. 8A$_{[CUIW1]}$ is a flow diagram illustrating one embodiment of a process for handling a state synchronization request from a client.
Figure 8B:
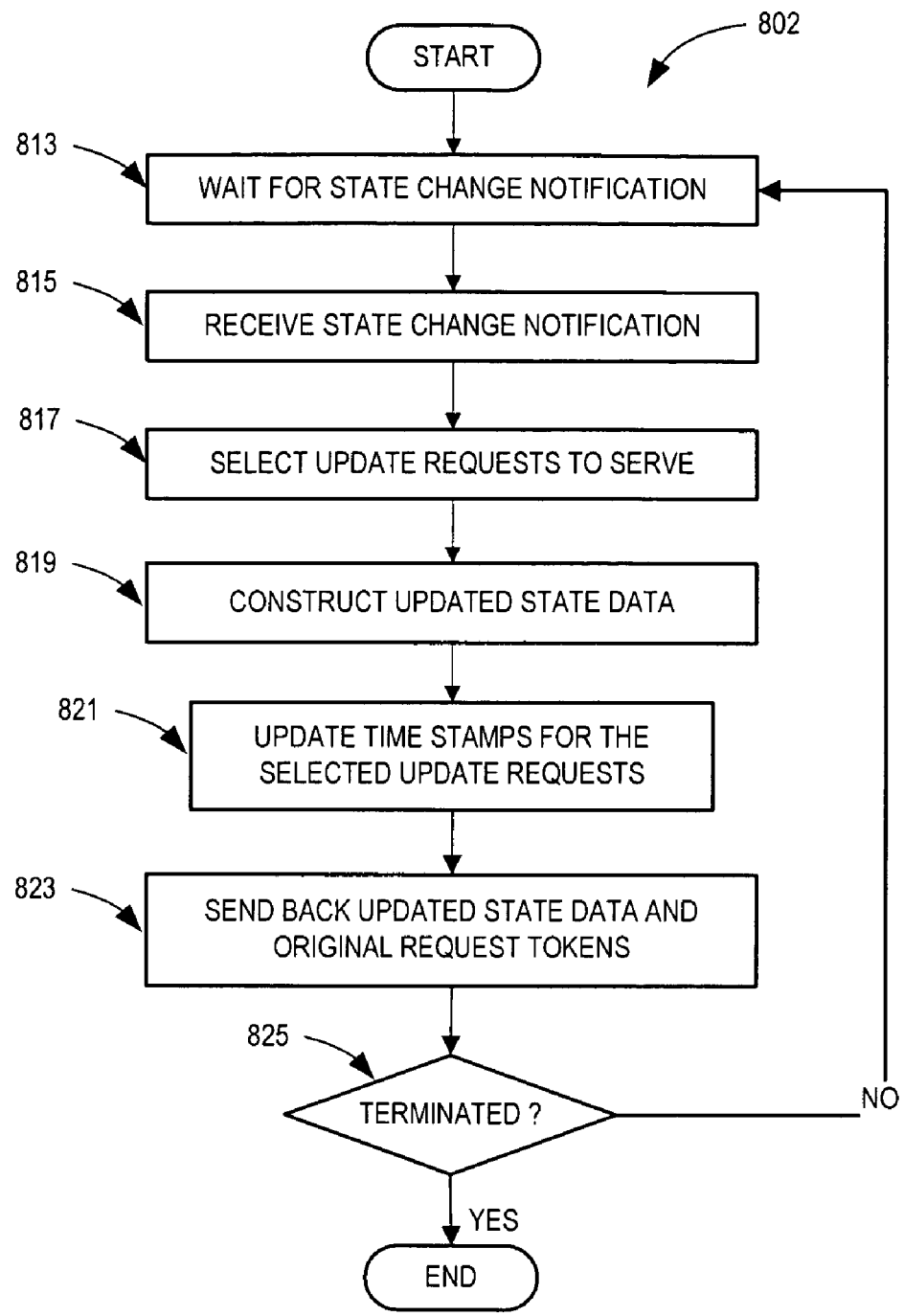
FIG. 8B is a flow diagram illustrating one embodiment of a process to handle a state change notification for a client.

FIG. 8B is a flow diagram illustrating one embodiment of a process to handle a state change notification for a client. In one embodiment, the processing logic listens for a state change notification message from a data source at block 813. The data source may be a local database or a remote database. The data stored in the data source may be business objects associated with the application state of a client. An update of the data stored in the data source may correspond to a change of the application state in a client. A change in the data stored in the data source may trigger a state change notification message. In one embodiment, the processing logic receives a state change notification at block 815. The processing logic may retrieve the data change from the data source according to the notification message. In one embodiment, the processing logic selects update requests to serve at block 817. An update request pending to be served may be selected according to a priority queue.

In one embodiment, the processing logic identifies an update request is relevant to the data change from the data source based on state information associated with the update request. The updated data in the data source may include a state identifier to be matched with the state information of an update request. In one embodiment, the processing logic obtains information about the updated state from the notification message. In one embodiment, the processing logic selects every update request having a matching application state with the updated data in the data source according to a priority queue. At block 819, according to one embodiment, the processing logic constructs updated state data in an update response according to the data change in the data source. The updated state data may contain the latest overall state or the delta of state according to specific requirement and situation. In one embodiment, the processing logic updates time stamps for the selected update requests. The time stamps may include token time stamps in request tokens. The processing logic may update time stamps in a request record. At block 823, according to one embodiment, the processing logic sends updated state data together with original request tokens to the clients associated with the selected update requests. The updated state data may be sent in an HTTP response. If the process 802 is not terminated at block 825, according to one embodiment, the processing logic continues listening constantly or periodically to notification messages back to block 813. The process 802 may be terminated by, for example, a shutdown message from a person.

Figure 9A:
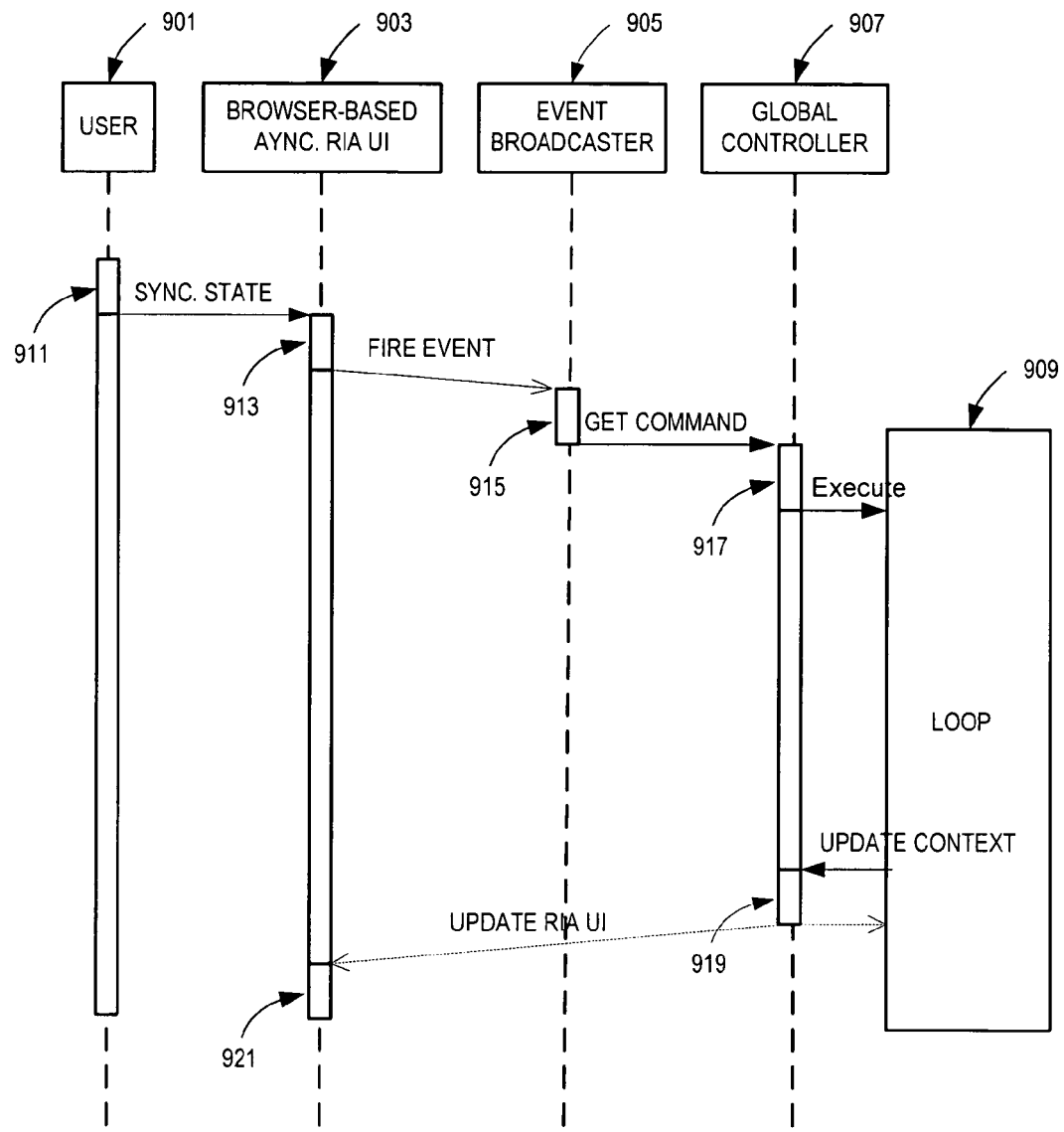
FIGS. 9A and 9B are timing diagrams illustrating a timing flow according to one embodiment of a process for synchronizing a client to a data source in a backend system.
Figure 9B:
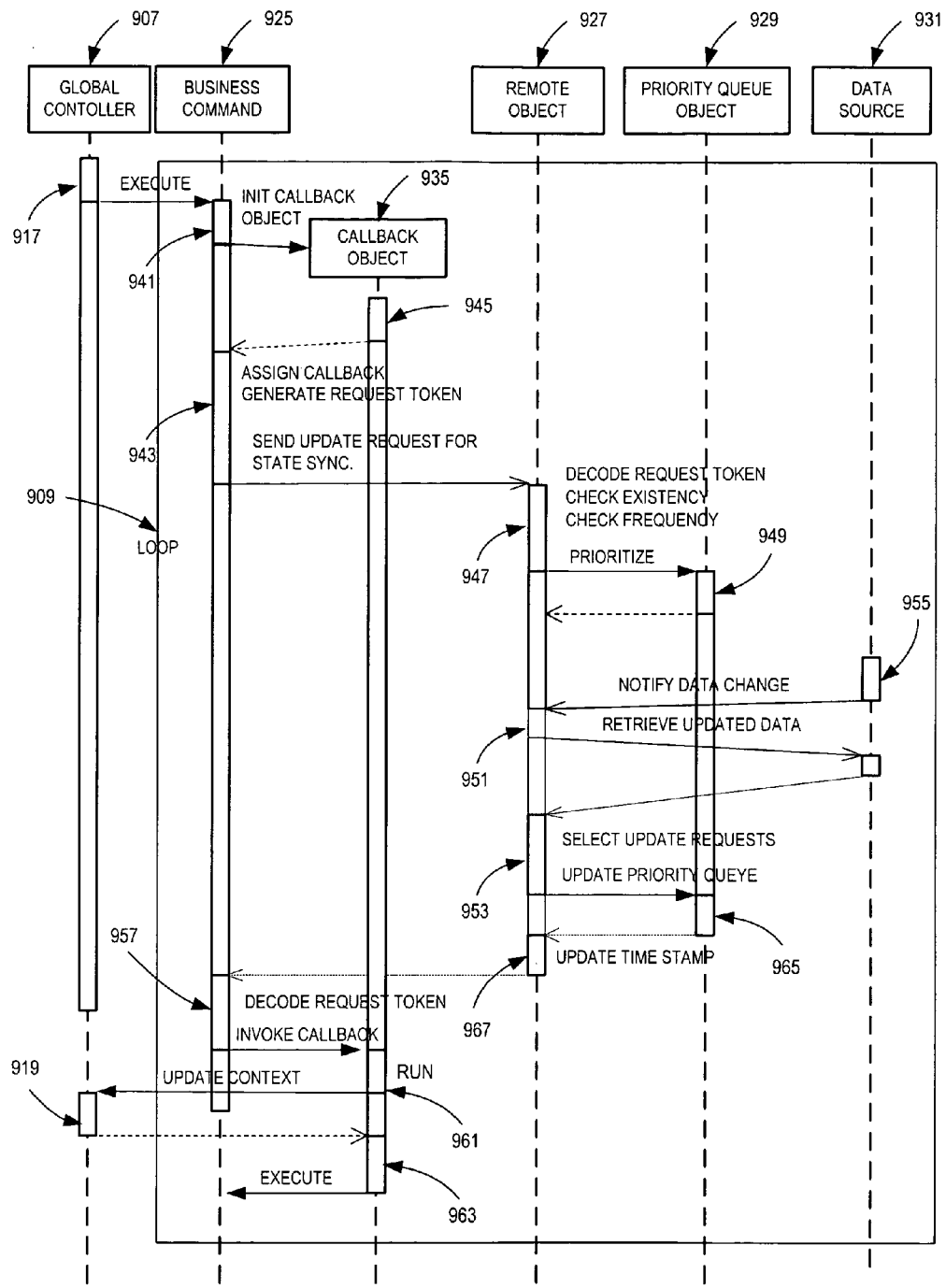

FIGS. 9A and 9B are timing diagrams illustrating a timing flow according to one embodiment of a process for synchronizing a client to a data source in a backend system. Starting with FIG. 9A, a user 901 in FIG. 9A may issue a synchronization request during period 911 through a browser based asynchronous RIA user interface 903. An event may subsequently be fired during period 913 to an event broadcaster 905. During period 915, the event broadcaster 905 may get a command for a global controller 907 to execute during period 917 after receiving the event. The global controller 907 may execute the command during period 917 to enter into a loop 909 to synchronize the user interface 903 with a data source without blocking operations of the user interface. When an update occurs in the data source, the global controller 907 may receive a context updating message to notify the user interface 903 asynchronously during period 919 to perform a user interface update during period 921.

Turning now to FIG. 9B, the global controller 907 may cause a business command 925 to initialize a callback object 935 during period 941. The callback object 935 may collect context information and construct itself during period 945. The reference of constructed callback object 935 may be returned to and assigned by the business command to generate a request token during period 943. The business object 925 may send a state update request with the request token to a remote object 927 during the same period 943 for synchronizing with a data source 931 without blocking operations of the user interface. The remote object 927 may be maintained in an application server connected through a network with the business command 925. The remote object 927 may be located in a backend system separated from the application server hosting the remote object 927. In one embodiment, the remote object 927 decodes the request token from the update request received from the business command 925 during period 947. The remote object 927 may search the request records to determine whether a previously received update request for the same application state already exits during period 947. The remote object 927 may also analyze whether the received update request is a frequent request according to the request records during period 947. In one embodiment, the remote object 927 calls a priority queue object 929 to prioritize a queue among update requests pending to be served during period 949 if the received update request is determined to be a frequent one.

In one embodiment, a data change occurs in the data source 931 during period 955. The data source 955 may notify the remote object 927 about the change for the remote object 927 to retrieve updated data during period 951. In one embodiment, the remote object 927 selects update requests with application states related to the retrieved updated data during period 953. The remote object 927 may call the priority queue object 929 to update the queue according to the selection of update requests and the data change in the data source during period 965. In one embodiment, the remote object 927 updates time stamps in the request records during period 967. The remote object 927 may update time stamps in a request token and/or latest information related to application states to be returned to the business command 925 in an update response. In one embodiment, the business command 925 receives an update response including updates in the application states during period 957 in response to the update request sent during period 943. The business command 925 may decode the enclosed request token from the received response during period 957.

In one embodiment, the business command 925 invokes a callback function according to a callback reference and a set of parameters extracted from the request token during period 957. The callback reference may refer to the callback object 935. In one embodiment, the business command invokes the callback object 935 to activate a context update during period 961. In one embodiment, the global controller 907 receives the context update from the callback object 935 to notify the user interface 903 of FIG. 9A asynchronously during period 919 to perform a user interface update during period 921 in FIG. 9A. After activating the context update, according to one embodiment, the callback object 935 may executes a command during period 963 and activate the business command 925 to initialize the callback object 925 again for sending a new update request, hence completing the loop 909.

Figure 10:
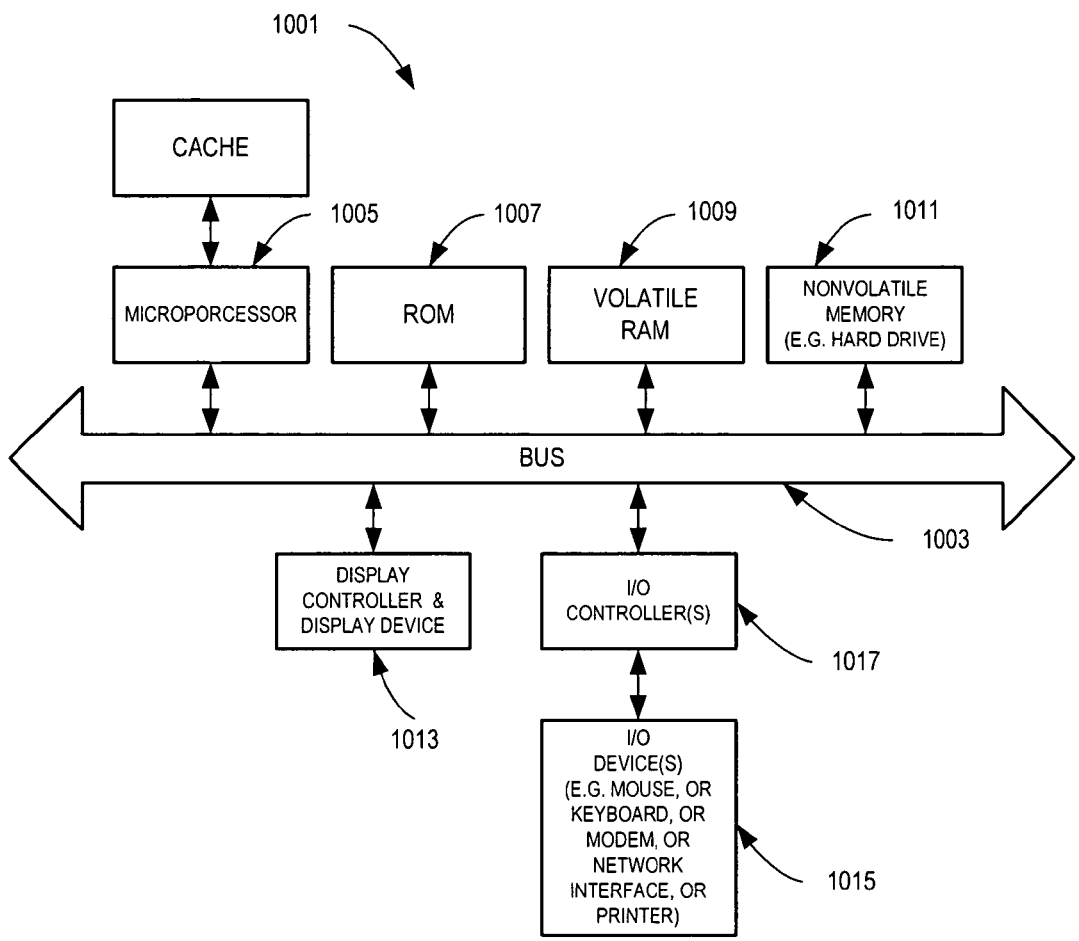
FIG. 10 illustrates one example of a computer system which may be used with one embodiment of the present invention.

FIG. 10 shows one example of a computer system 1001 which may be used with one embodiment of the invention. For example, system 1000 may be implemented as a part of a server and/or a client as shown in FIG. 2, 3, or 7 described above. Note that while FIG. 10 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 10, the computer system 1001, which is a type of a data processing system, includes a bus 1003 which is coupled to a microprocessor(s) 1005 and a ROM (Read Only Memory) 1007 and volatile RAM 1009 and a non-volatile memory 1011. The microprocessor 1003 may retrieve the instructions from the memories 1007, 1009, 1011 and execute the instructions to perform operations described above. The bus 1003 interconnects these various components together and also interconnects these components 1005, 1007, 1009, and 1011 to a display controller and display device 1013 and to peripheral devices such as input/output (I/O) devices which may be mice, keyboards, modems, network interfaces, printers and other devices which are well known in the art. Typically, the input/output devices 1015 are coupled to the system through input/output controllers 1017. The volatile RAM (Random Access Memory) 1009 is typically implemented as dynamic RAM (DRAM) which requires power continually in order to refresh or maintain the data in the memory.

The mass storage 1011 is typically a magnetic hard drive or a magnetic optical drive or an optical drive or a DVD RAM or other types of memory systems which maintain data (e.g. large amounts of data) even after power is removed from the system. Typically, the mass storage 1011 will also be a random access memory although this is not required. While FIG. 10 shows that the mass storage 1011 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1003 may include one or more buses connected to each other through various bridges, controllers and/or adapters as is well known in the art.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In addition, the operations described above may be performed by an apparatus. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, ABAP, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.), or a more specific form of program code that is targeted for a specific processor.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The processes and displays presented herein are not specifically related to a particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the scope of the invention.

What is claimed is:

1. A computer-implemented method, comprising:

receiving, at an application server from at least one client, a plurality of update requests, each update request of the plurality of update requests comprising a request for retrieval from the application server of an application state of a client application running within one of the at least one client;

recording the plurality of update requests as a plurality of request records in a request record database;

identifying, by the application server, a set of update requests of the plurality of update requests for which the application server does not yet have a corresponding state update available;

maintaining a priority queue in which a priority is assigned to each update request in the set of update requests, the priorities being assigned by comparing frequencies between update requests of the set of update requests received from different clients, the comparing comprising identifying, using the request record database, clients that make more frequent update requests and assigning higher priority to update requests that are received from the clients that make more frequent update requests;

receiving, at the application server from a backend server that stores at least one data source, notification regarding at least one change in the at least one data source that affects the application state requested by at least two of the set of update requests; and sending, from the application server, an update response to the client from which the update request of the at least two update requests having higher priority in the priority queue was received.

2. The method of claim 1, wherein the maintaining the priority queue further comprises:

examining whether a same application state has been previously requested and is pending in the priority queue for a given one of the set of update requests; and assigning the given one of the set of update request a priority value assigned to a previous update request for the same application state in the priority queue.

3. The method of claim 2, wherein the frequency for a given one of the set of update requests comprises a reciprocal of a time interval corresponding to an elapsed time between receipt by the application server of the given one of the set of update requests and receipt by the application server of a last previous update request from a same client that sent the given one of the set of update requests.

4. The method of claim 1, wherein the at least one data source is associated with an ERP (Enterprise Resource Planning) system.

5. The method of claim 3, wherein an update request of the plurality of update requests comprises a request token asynchronously sent from a controller of a client of the at least one client, the controller being communicatively coupled to the client application of the client of the at least one client, the request token comprising a reference to a callback object associated with the client application, wherein the client application is a web client application, the update response to the client comprising the request token to enable the controller of the client to notify the client application by calling back the client application via the callback object associated with the request token.

6. The method of claim 5, wherein the controller of the client is configured to retrieve the reference to the callback object in order to invoke the callback object.

7. The method of claim 5, further comprising receiving a second update request at the application server from the client subsequent to sending the update response to the client, the second update request comprising the reference to the callback object.

8. The method of claim 7, wherein the callback object is used to call back the client application by the controller of the client in response to the client receiving a second update response from the application server, the second update response being associated with the second update request.

9. A machine-readable storage medium having instructions therein, which when executed by a machine, causes the machine to perform operations comprising:
- receiving, at an application server from at least one client, a plurality of update requests, each update request of the plurality of update requests comprising a request for retrieval from the application server of an application state of a client application running within one of the at least one client;
- recording the plurality of update requests as a plurality of request records in a request record database;
- identifying, by the application server, a set of update requests of the plurality of update requests for which the application server does not yet have a corresponding state update available;
- maintaining a priority queue in which a priority is assigned to each update request in the set of update requests, the priorities being assigned by comparing frequencies between update requests of the set of update requests received from different clients, the comparing comprising identifying, using the request record database, clients that make more frequent update requests and assigning higher priority to update requests that are received from the clients that make more frequent update requests;
- receiving, at the application server from a backend server that stores at least one data source, a notification regarding at least one change in the at least one data source that affects, the application state requested by at least two of the set of update requests; and
- sending, from the application server, an update response to the client from which the update request of the at least two update requests having higher priority in the priority queue was received.

10. The machine-readable storage medium of claim 9, wherein the maintaining the priority queue further comprises:
- examining whether a same application state has been previously requested and is pending in the priority queue for a given one of the set of update requests; and
- assigning the given one of the set of update request a priority value assigned to a previous update request for the same application state in the priority queue.

11. The machine-readable storage medium of claim 10, wherein the frequency for a given one of the set of update requests comprises a reciprocal of a time interval corresponding to an elapsed time between receipt by the application server of the given one of the set of update requests and receipt by the application server of a last previous update request from a same client that sent the given one of the set of update requests.

12. The machine-readable storage medium of claim 9, wherein the at least one data source is associated with an ERP (Enterprise Resource Planning) system.

13. The machine-readable storage medium of claim 11, wherein an update request of the plurality of update requests comprises a request token asynchronously sent from a controller of a client of the at least one client, the controller being communicatively coupled to the client application of the client of the at least one client, the request token comprising a reference to a callback object associated with the client application, wherein the client application is a web client application, the update response to the client comprising the request token to enable the controller of the client to notify the client application by calling back the client application via the callback object associated with the request token.

14. The machine-readable storage medium of claim 13, wherein the controller of the client is configured to retrieve the reference to the callback object in order to invoke the callback object.

15. The machine-readable storage medium of claim 13, wherein the operations further comprise receiving a second update request at the application server from the client subsequent to sending the update response to the client, the second update request comprising the reference to the callback object.

16. The machine-readable storage medium of claim 15, wherein the callback object is used to call back the client application by the controller of the client in response to the client receiving a second update response from the application server, the second update response being associated with the second update request.

17. A data processing system, comprising:
- a processor; and
- a memory for storing instructions which when executed from the memory, cause the processor to perform an operation, the operation including
- receiving, at an application server from at least one client, a plurality of update requests, each update request of the plurality of update requests comprising a request for retrieval from the application server of an application state of a client application running within one of the at least one client;
- recording the plurality of update requests as a plurality of request records in a request record database;
- identifying, by the application server, a set of update requests of the plurality of update requests for which the application server does not yet have a corresponding state update available;
- maintaining a priority queue in which a priority is assigned to each update request in the set of update requests, the priorities being assigned by comparing frequencies between update requests of the set of update requests received from different clients, the comparing comprising identifying, using the request record database, clients that make more frequent update requests and assigning higher priority to update requests that are received from the clients that make more frequent update requests;
- receiving, at the application server from a backend server that stores at least one data source, notification regarding at least one change in the at least one data source that affects, the application state requested by at least two of the set of update requests; and
- sending, from the application server, an update response to the client from which the update request of the at least two update requests having higher priority in the priority queue was received.

18. The system of claim 17, wherein the maintaining the priority queue further comprises:
- examining whether a same application state has been previously requested and is pending in the priority queue for a given one of the set of update requests; and assigning the given one of the set of update request a priority value assigned to a previous update request for the same application state in the priority queue.

19. The method of claim 1, wherein each update request of the plurality of update requests further comprises: a client/session identifier identifying the one client and a connection session established between the one client and the application server, and a current state of data maintained for the client application at the one client.

20. The method of claim 19, wherein each of the request records corresponds to one of the plurality of update requests and comprises the client/session identifier of the one of the plurality of update requests and a time when the one of the plurality of update requests was received by the application server.

* * * * *